Figure 1:
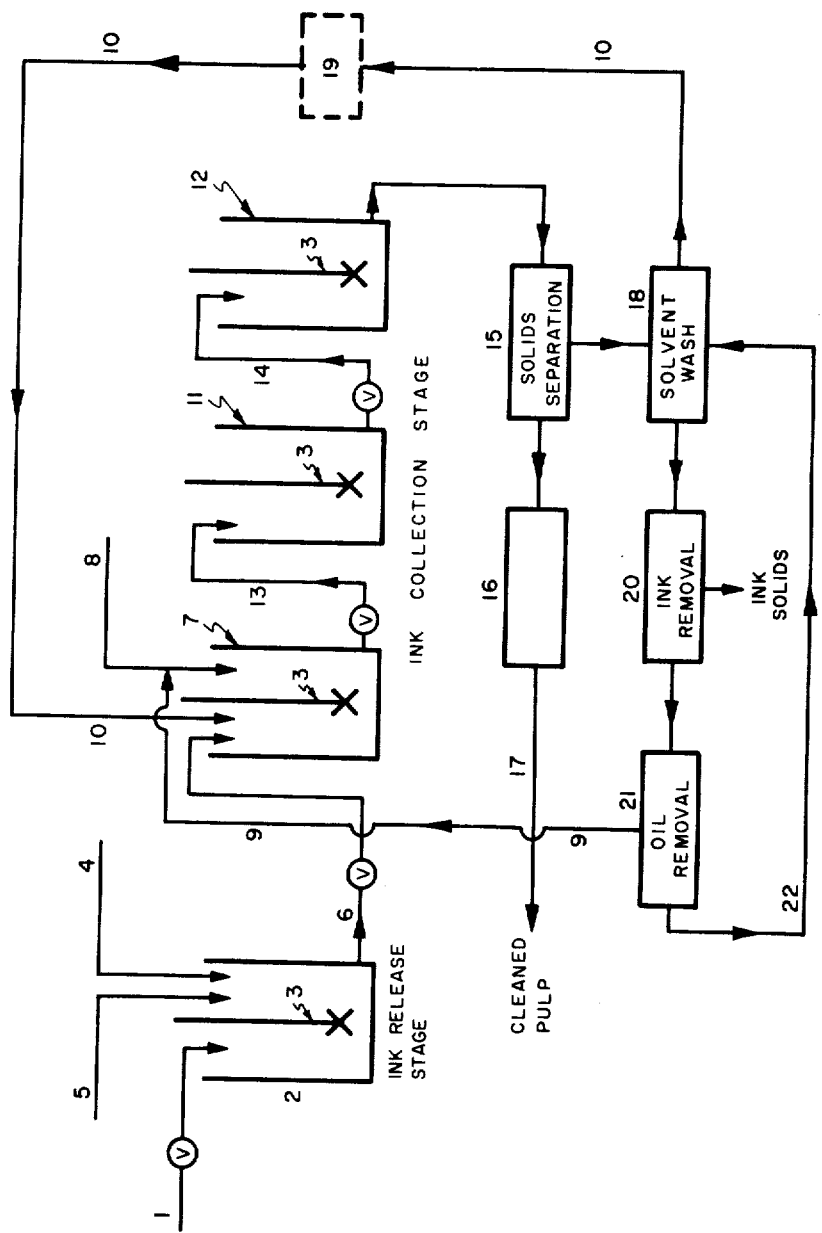

United States Patent [19]

Puddington et al.

[11] 4,076,578
[45] Feb. 28, 1978

[54] INK REMOVAL FROM WASTE PAPER

[75] Inventors: Ira E. Puddington; Bryan D. Sparks, both of Ottawa; Ernest A. Sexton, St. Catharines, all of Canada

[73] Assignees: Canadian Patents and Development Limited, Ottawa; The Ontario Paper Company Ltd., St. Catharines, both of Canada

[21] Appl. No.: 711,058

[22] Filed: Aug. 2, 1976

Related U.S. Application Data

[63] Continuation-in-part of Ser. No. 516,775, Oct. 21, 1974, abandoned.

[51] Int. Cl.$^2$ .............................................. D21C 5/02
[52] U.S. Cl. .......................................... 162/5; 162/6; 162/7; 162/8
[58] Field of Search .......................... 162/5, 8, 55, 6, 7; 210/40

[56] References Cited

U.S. PATENT DOCUMENTS

| | | | |
|---|---|---|---|
| 2,005,742 | 6/1935 | Hines | 162/5 |
| 3,056,713 | 10/1962 | Gartner | 162/5 |
| 3,764,460 | 10/1973 | Miyamoto et al. | 162/5 |
| 3,803,033 | 4/1974 | Sutherland | 210/40 |
| 3,844,941 | 10/1974 | Jones | 210/40 |

FOREIGN PATENT DOCUMENTS 2,211,079  9/1972  Germany ............................. 162/5

*Primary Examiner*—Robert L. Lindsay, Jr.
*Assistant Examiner*—William F. Smith
*Attorney, Agent, or Firm*—Alan A. Thomson

[57] ABSTRACT

Waste paper, particularly newsprint, is treated to release adhering ink particles (e.g. pigment carbon) from the paper fibers, and the ink solids (and organic contaminants) are then preferentially collected on the surface of inserted non-soap solids which have an affinity for, and are of larger size than, the ink solids. The ink-coated solids can be removed from the system by suitable physical means such as hydrocyclones, screens or decantation.

22 Claims, 1 Drawing Figure

INK REMOVAL FROM WASTE PAPER

This application is a continuation-in-part of Ser. No. 516,775 filed Oct. 21, 1974 (abandoned).

This invention is directed to the de-inking of waste inked paper to give a re-usable paper stock. A method is described wherein the ink is rendered non-adherent to the cellulosic or paper substrate, the free ink particles are collected on the surface of selected solids and the ink-coated solids removed from he system leaving a clean paper stock.

The two basic problems in de-inking newsprint are (a) releasing ink from the paper fibers, and (b) separating the ink particles and contaminants from the paper fibers or pulp. It has been known that printing ink could be released at least to some extent from paper substrates by treatment of their aqueous suspensions with detergents, caustics, heat or intense mechanical action, or certain combinations of these. The physical removal of the ink from the pulp to give a stock of high brightness has been difficult to accomplish efficiently.

Ink Removal Techniques in paper de-inking processes presently in use are usually of two types (1) Washing, and (2) Flotation. Other methods such as solvent extraction have been attempted but have failed to produce acceptable products. In washing processes, ink is released from the paper fiber substrate and dispersed in the aqueous phase by detergents. The dispersed ink is then removed from the pulp by repeated washings on screens. This technique involves multiple dilution and thickening steps, fiber losses are high (20 to 30%) and the liquid effluent is a serious pollution problem. The flotation technique has fewer drawbacks than the washing process but it does not appear to be economically attractive for large scale plants because the low pulp consistency (dilution) required necessitates the use of large equipment. Also fiber loss is of the order of 5 to 10%. Consequently flotation has only been used in the paper industry on a small scale and then mainly for de-inking chemical pulp. A flotation de-inking is described in U.S. Pat. No. 2,005,742, Hines where the ink is flocculated, then collected by liquid collectors, and separated by froth flotation.

Many waste paper stocks also contain organic contaminants or "contraries" such as latex adhesives, waxes, polyethylene film, polymeric sizes or coatings etc. While these contaminants tend to separate from the paper fibers along with the ink, they are very difficult to remove from the pulp by conventional means. Their presence can cause serious operating problems in existing-de-inking processes, to the extent that waste containing such organic contaminants usually must be sorted out of the supply before it is processed. However, many troublesome contaminants cannot be removed by hand sorting and segregation at the source of these contaminants is not always feasible. Therefore new de-inking processes should desirably be able to tolerate such coatings, adhesives etc. and to eliminate them as completely as possible from the pulp.

In U.S. Pat. No. 3,764,460 Oct. 9, 1973 Miyamoto et al is described a de-inking process utilizing very fine polyolefin particles of up to about 0.003 mm. diameter in an emulsified organic phase to absorb or entrain the ink, and the ink-loaded organic phase is then floated and skimmed off from the pulp. An organic solvent was always added in the Examples. The recoveries of cleaned paper appeared to vary from 70 to 90% (see Ex. 5–13). The organic phase is evidently discarded. It would be desirable to improve on this process particularly by increasing paper recoveries, obtaining a simpler separation of ink and organic contaminants utilizing the type of machinery common to pulp mills, and allowing recycle of collecting surfaces.

West German Offen. No. 2,211,079 forms soap particles in the presence of weighting substances. These weighted soap solids are used in a de-inking system in conjunction with organic liquids such as terpenic hydrocarbons, the liquid entraining both the ink and soap solids serve as a bulking-weighting agent for the organic phase.

We have now found that when the ink-release from the fibers has been completed, an improved separation of the ink (and organic contaminants) can be achieved by collection on the surface of selected non-soap solids, the coated solids then being separated without flotation from the residual paper stock. Separation steps taking advantage of the larger size and/or heavier density of the coated solids can be used e.g. screening, centrifuging, cyclones, etc. A magnetic separation is also possible as discussed below. With this process a clean mechanical separation of solids based on their physical properties, rather than on their surface interaction as in flotation, is possible leading to improved recovery.

The method of the invention comprises the following steps:

a. forming an aqueous pulp of said paper, releasing the ink particles adhering to the paper fibers and dispersing the ink solids in the pulp, b. inactivating any ink-dispersing agent present by precipitation, agitating the resulting aqueous mixture containing ink solids and paper fibers in the presence of inserted selected non-soap collecting solids and collecting ink solids on the surface of the collecting solids, said collecting solids having hydrophobic surfaces with strong affinity for said ink solids, the collecting solids being at least about 0.04 mm. in diameter and large enough that many ink particles or agglomerates thereof adhere side-by-side on the collecting surface, the mixture being brought into intimate contact with the hydrophobic collecting surfaces, c. separating the ink-coated collecting solids in easily handled solid form from the paper fibers by a mechanical separation without froth flotation and d. recovering relatively clean paper stock. In the attached drawing FIG. 1, a partially schematic Flowsheet is shown for one preferred operation according to the invention.

While various ink-releasing steps may be used, we have found most satisfactory the treatment of the waste paper as an aqueous pulp with dissolved de-inking chemicals including suitable inactivatable or transient surfactant and caustic. The pulp consistency at this stage may be up to about 6% or more, as long as uniform mixing can be accomplished. The pulp is usually at an elevated temperature to accelerate de-inking, e.g. at 60°–90° C.

The collecting solids are selected from materials having hydrophobic surfaces with a strong affinity for the ink particles such as waxes, polyolefins and other vinyl polymers, rubbers (e.g. ground waste rubber), solid petroleum materials, pitches, gums, sulfur, silica with surface hydroxyls replaced with hydrophobic organic groups, etc. Any solids available in a suitable size and density may be coated and used as collectors.

Where the collecting surface has insufficient attraction for and retention of the ink particles, the surface may be coated with a hydrophobic adhesive collecting agent. Suitable collecting agents include sticky viscous oils, soft waxes, sticky gums and hydrophobic contact adhesives — in small amounts. Too great an amount of sticky collecting agent will disperse the ink and tend to form agglomerates or sticky masses separate from the collector solids. Where oils are used the viscosity should be at least about 2 cp (at 110° F) but not above about 90 cp. More than about 2% by weight of oil based on the paper solids has been found detrimental. A brightness of 53% has been obtained with an inexpensive reduced crude oil at 0.5% concentration. Alternatively the solids may be suitable plasticized to increase adhesion to the surface e.g. polyethylene containing paraffin wax.

Mixtures of collecting solids may be used in some cases. Where contaminants other than ink are also present, one type of solid giving optimum collection of ink can be utilized together with a second type of solid aiding collection of contaminants. It is also possible to carry out the process in two or more stages. For example the first stage could be with recycled solids and the second with fresh collecting surfaces; or the first stage could be primarily for ink removal with one type of solid, and the second for other contaminant removal with a second type of solid.

The size of the solids should be large enough for the separation from the residual paper to be easily accomplished but should not be so large as to have insufficient active (specific) surface or be difficult to agitate and handle. The shape of the collecting bodies is not critical: solid or porous prills, pieces of rigid sponge, mesh, flakes, short rods, etc. can be used. A porous surface has been found most effective. A suitable prill size is usually within about 0.1 mm to about 4 mm diameter, preferably about 0.2-1 mm. We have obtained better results with fine prills less than 1 mm diameter, as long as these with fine prills could be subsequently completely removed from the system. In some cases fine particles of smaller size (e.g. down to about 0.04 mm diameter) can be used where there is a large density or other property difference allowing ready separation. For example sulphur powder of as small as about 325 mesh size has been used as inserted solids with removal (preferably as agglomerates formed at elevated temperature) from the pulp being carried out by hydrocyclones. The density of sulphur is about 2, allowing good separation by centrifugal means. The collecting solid density should preferably be much greater than that of the suspension of paper fibers to facilitate separation.

The amount of solids can be varied depending on the surface area, time allowed for collection, efficiency of collection, ink content in paper, etc. A suitable amount will be readily apparent or easily determined. Brightness was observed to increase as the weight ratio of collecting solids to paper fiber increased about 1/1 to about 5/1.

In order for the collecting solids to contact and pick up the released ink material (thorough agitation or intermingling is essential.) This may be accomplished by a variety of techniques such as high speed stirrers, movement of the container as by rotation, reciprocation, etc., feeding through mills, pumps, impellers, extrusion devices, nozzles, etc. Any technique which will result in movement of the solids through the ink-paper mixture can be adapted to the process.

The time required for collection of the ink particles on the solids depends on many factors but collection is usually substantially complete is less than 15 min. This time is particularly dependent on the ability of the collecting surfaces to attract and retain the ink particles. The collection of printing ink on the hydrophobic surfaces is a reversible process. Collected ink can be abraded from the surface on repeated impact with container walls, agitator blades, etc. if agitation is too severe or prolonged.

The temperature during the collection stage has been found to affect ink removal and brightness with an optimum observed between 30° to 50° C. However satisfactory results have been obtained at temperatures outside this range. The temperature will affect the viscosity of the collecting agent (as well as the rheological properties of the printing inks) and the temperature is usually selected to optimize the collecting effect for the particular collecting agent-ink system in the process. For instance with sulphur solids, a temperature of about 70° -92° C may be preferred as some agglomeration of sulphur can be achieved for easier separation.

We have found it desirable for most efficient initial release of the ink particles to prepare an aqueous pulp of the waste paper containing caustic (preferably added as peroxide) to a pH of about 10 to 11 and including an inactivatable or transient surfactant. Alternatively sodium silicate with or without added soap or caustic has given good results. The effectiveness of the soaps for de-inking varied and appeared related to their water solubility. The most soluble soaps (sodium linoleate and potassium oleate) were more effective at low concentrations than less soluble soaps (Na oleate and Ca oleate). Crude tall oil soap and a partially refined tall oil soap were somewhat less effective alone under the same conditions, but would be more economical. The amount of soap required is not critical with about 0.5 to 3% by weight of the dry paper being adequate in most cases. Some analogous surfactants (other than soap), and mixtures may also be used. Maximum brightness was achieved with the use of peroxide to give a pH of 10 to 11 rather than caustic. There is some indication that caustic at temperatures above about 82° C causes partial dissolution of ink particles.

In some instances the printing ink tended to collect as agglomerates of itself rather than on the collecting surface leading to the presence of black specks in the final stock. It was found that linoleate soaps in particular minimized this problem.

While the presence of soap or detergent or sodium silicate in highly soluble form is desirable for optimum de-inking, this is not the case for the collecting step since the free soluble dispersant inhibits collection. It is desirable to precipitate or otherwise convert any free soluble dispersant into a relatively inactive form before preceeding with collection. Polyvalent metal cations e.g. Ca, Mg, Ba, Fe, etc. will usually accomplish this although other precipitants may be used. Calcium chloride is a preferred pecipitant for the soaps and silicates in the following examples. With soap added at a level of about 0.5 – 0.8% weight of dry fiber, the Ca $Cl_2$ content should be approximately 1% for optimum brightness In the presence of sodium silicate, the amount of Ca $Cl_2$ (or other precipitant) should be proportionately higher.

The type of inked waste paper or cellulosic product treated is not critical so long as the ink is hydrophobic and the product can be pulped in an aqueous system. Newsprint is the most common product amenable to the invention but magazines, inked cartons, packaging etc. can also be processed. This process is able to remove significant amounts of the "contraries" associated with such non-newsprint materials.

After the collection and removal of the ink (and contaminants) the pH of the pulp stock may be adjusted to effect some improvement in brightness of the regenerated paper. A final pulp pH of about 8 to 9 has been found to give optimum brightness with newsprint. The use of alum to adjust the pH can largely eliminate the yellowing believed to be caused by the use of caustic in the de-inking.

One very suitable technique for separation of the ink-loaded collection bodies is to make the bodies is to make the bodies with a magntic component and subject the mixture to a magnetic separation as is known in the mineral processing industry. For instance iron powder was dispersed in a polyethylene matrix and prills formed from the mixture. The presence of the iron powder allowed these prills to be separated by a magnetic collection device. High intensity wet magnetic separators are in use in ore beneficiation. For non-magnetic solids, hydrocyclones and screens have shown promise in separating the coated solids. Hydrocyclones are very satisfactory with the denser solids.

The solids used for de-inking become heavily coated with ink (and organic contaminants) which can be at least partially removed if recycle is desired. Several cleaning techniques have been investigated i.e. washing with organic solvents or soap solutions or steaming. Solvents such as acetone, ethanol, and aliphatic hydrocarbon solvents (e.g. Varsol-trademark) gave adequate cleaning. The aliphatic hydrocarbon solvents and soap or sodium silicate solutions were most effective. The ink particles removed by the solvents tended to settle and in many cases could be readily separated allowing recycle of the solvents. A decrease in brightness occurred after the first recycle of solids with the cleaning agents tested. This brightness loss was of the order of 5 units on the Hunter Brightness Scale. Repeated use of solvents gave some further decrease in brightness on succeeding cycles unless residual solvent was carefully removed. It is apparent that the cleaning operation adversely affects the solids and inhibits the collection of ink in subsequent cycles. This problem can be overcome by forming a hydrophobic coating after each cycle, or by completely reforming new surfaces before recycling. Alternatively the ink coating can be partially removed as by an abrading action and the partially coated solids recycled.

With sulphur solids cleaning and reclamation can be effected in several ways. The sulphur can be recycled at least several times before cleaning or reforming should be necessary. One preferred technique would be to melt the sulphur, filter or decant non-sulphur solids, and atomize or otherwise reform the solids from the melt. Instead of atomizing, the molten sulphur can be solidified and ground to the selected particle size. Also, the dirty sulphur could be utilized by conversion to sulfite for use in the manufacture of chemical pulp rather than recycled.

The process of the invention is particularly adapted to the de-inking and recycling of waste newsprint, and is capable of giving a regenerated paper with a brightness close to that of unprinted paper. For example de-inked waste newsprint had a brightness of 59.4% compared to 60.5% for margins processed in the same way. The strength and printability of the product are acceptable. The process will operate with relatively high pulp consistencies, liquid effluent discharge should be less than prior processes, and the fiber recovery approaches 100%.

In most cases the pulp consistency for the ink-releasing stage may be up to about 6-7%, within about 0.5 to 4% for the ink-collection stage, and not more than about 2% for the coated solids removal stage.

Microscopic observations have been made on ink and soap particles in a de-inking medium. After de-inking waste newsprint in a Na oleate-Na silicate medium, the ink particles were observed to form agglomerates (with residual oil from the ink). The individual agglomerates of carbon particles averaged about 10 micrometers in average diameter, but some larger clusters were noted. Fresh printing ink dispersed in the same medium behaved in the same way.

Sodium oleate was precipitated with calcium chloride in a vigorously-stirred solution, and the soap particles were observed to have diameters up to approximately 10 micrometers, most falling within about 5-10 micrometers. Under the same conditions the soap was also precipitated in the presence of dispersed ink and the system observed microscopically. The soap particles were observed to have loosely flocculated together with the ink particles to a considerable extent (no discrete tight agglomerates were formed). These soap/ink flocculates had a density close to that of the suspensions and could not be settled for concentrated adequately in a hydrocyclone, i.e. they would remain with the paper fibers in a de-inking operation using such a separation step.

We have made many observations on the effect of inserted collecting solids in such soap/ink/de-inking medium mixtures. Where the inserted collecting solids have an average particle size of the same order as, or up to about twice the average diameter of the individual ink agglomerates (i.e. up to about 20 micrometers), the collecting solids were observed to loosely flocculate together with the ink. the ink was only loosely held in the flocs and was susceptible to re-dispersion. These flocculates tended to occlude both precipitated soap and paper fibers. Where the collecting solids had a high enough density to allow a good separation, e.g. by cyclones, the collecting solids could be separated and recovered along with some of the ink. However, part of the ink remained dispersed and did not separate with the collecting solids.

The situation changed when the size of the collecting solids was increased. When the average diameter of the inserted collecting solids was relatively large, e.g. preferably not less than about 10 times the average ink agglomerate size ($\sim$10 micrometers), the ink was observed to become attached, and to adhere to the collecting solids surfaces. With suficient agitation, the ink was observed microscopically to smear over the surface, i.e. the ink agglomerates tended to merge and to cover the surfaces. The ink thus became very firmly attached to the surface and was not susceptible to re-dispersion in the medium. With the small amount of soap present (as used for initial ink release and dispersion) only a very small part of the ink remains occluded within the soap phase. This soap phase tends to float and can be removed separately if desired. The effect of soap solids, and of size of collecting solids on ink collection is illustrated further in Example 12 below.

According to this invention, the size of the inserted collecting solids should be large enough that many ink particles or agglomerates can adhere side-by-side on the surface and preferably become smeared together over the surface. Usually, this size is at least about 100 micrometers average diameter, and preferably at least about 200 micrometers.

The following examples are illustrative. The general procedure consisted of dissolving caustic (peroxide or hydroxide) and soap in hot city water, adding dry shredded waste paper to a consistency of about 2.5% and pulping at high speed (ink release stage). The pulp was then diluted and the temperature lowered with cool water, excess soap precipitated, collecting solids and collecting agent added and the system agitated (ink collection). The system was diluted and the coated solids removed (usually by settling). The clean pulp pH was lowered usually with alum, and test pads prepared from the stock for brightness measurement according to standard C.5 of the Canadian Pulp and Paper Association.

Measurements of pad brightness were made with a Hunter reflectometer using a green filter and porcelain standards. Brightness measurements were made on both sides of the pad. Pads from untreated paper had a brightness of 42.4% and processed un-inked paper (margins) had a brightness of 60.5%.

EXAMPLE 1

The following mixture was pulped in a food mixer for two minutes at about 5000 rpm to effect ink release.

| 200 mls | water (90 - 95° C) |
|---|---|
| 0.03 g | sodium oleate |
| 0.10 g | sodium peroxide (93%) |
| 5 g | dry, shredded waste newsprint |
| Then | |
| 300 mls | water (to give a final temperature of 40 - 45° C) |
| 0.05 g | calcium chloride |
| 0.1 ml | SAE 30 motor oil |
| 2.5 g | porous polyvinyl chloride prills (Geon 92 - trademark) (about 0.15 - 0.2 mm diameter) | were incorporated and the mixture agitated in the same mixer for 15 minutes at about 3000 rpm to collect the ink.

Alum was added to pH5, the resulting pulp system diluted to 0.1% consistency, and the coated prills allowed to settle out under gentle agitation. Brightness test pads were formed by filtration.

| Brightness: | Top side | 57.4% |
|---|---|---|
| | Filter side | 56.5% |

EXAMPLE 2

An initial mixture similar to Example 1 was pulped in a food mixer for two minutes at about 5000 rpm to release the ink. The incorporation of

| 300 mls | water (final temperature 40–45° C) |
|---|---|
| 0.05 g | calcium chloride |
| 0.06 ml | SEA 30 motor oil |
| 5 g | polyethylene (spheres 4 mm dia.) | was completed and the mixture agitated in the mixer for 15 minutes at about 3000 rpm to deposit the ink on the spheres. This pulp mixture was diluted to 0.5% consistency and the coated prills separated.

Alum was added to pH 5 and test pads prepared.

| Brightness: | Top side | 51.4% |
|---|---|---|
| | Filter side | 52.0% |

EXAMPLE 3

The following ingredients were intermixed

| 200 mls | water (90 - 95° C) |
|---|---|
| 0.04 g | sodium linoleate |
| 0.10 g | sodium peroxide (93%) |
| 5 g | dry, shredded, waste newsprint | and pulped in a food mixer for two minutes at about 5000 rpm.

| Then | 300 mls | water (final temperature 40–45° C) |
|---|---|---|
| | 0.05 g | calcium chloride |
| | 5 g | 56:36 w/w wax: polyethylene composite prills containing 8% iron powder (0.5 mm. dia. spheres) | were incorporated and the system agitated in the mixer for 15 minutes at about 3000 rpm. The pulp was diluted to 0.1% and the spheres removed magnetically. The pH of the pulp was then adjusted to 8.4 with alum and test pads prepared.

| Brightness: | Top side | 59.8% |
|---|---|---|
| | Filter side | 59.0% |

These values are very close to that of the ink-free paper.

EXAMPLE 4

A mixture was made of the following

| 200 mls | water (90 - 95° C) |
|---|---|
| 0.1 g | Tall oil soap skimmings (94% solids) |
| 0.1 g | sodium peroxide |
| 5 g | dry, shredded, waste newsprint | and the mix pulped in a food mixer for two minutes at about 5000 rpm.

The addition of

| 300 mls | water (final temperature 40 - 45° C) |
|---|---|
| 0.05 g | calcium chloride |
| 20 g | polyethylene spheres (4mm. dia.) | was completed and the system agitated in the mixer for five minutes at about 3000 rpm. Then the pulp was diluted to 0.5% consistency and the spheres separated to remove the ink. Alum was added to pH 8.4, and test pads prepared.

| Brightness: | Top side | 52.0% |
|---|---|---|
| | Filter side | 53.4% |

EXAMPLE 5

A pulp of

| 200 mls | water (90 - 95° C) |
|---|---|
| 0.04 g | sodium linoleate |
| 0.05 g | sodium hydroxide |
| 5 g | dry, shredded, waste newsprint | was prepared by pulping in a food mixer for two minutes at about 5000 rpm.

For the ink collection step

| 300 mls | water (final temperature 40 – 45° C) |
|---|---|
| 0.05 g | calcium chloride |
| 5 g | 56:36 w/w wax: polyethylene composite prills containing 8% iron powder (0.5 mm. dia. spheres) | were added and the mixture agitated in the mixer for 15 minutes at about 3000 rpm. This pulp system was diluted to 0.1% and prills removed magnetically. The pH of the clean pulp was then adjusted to 8.4 with alum, and test pads prepared.

| Brightness: | Top side | 51.3% |
|---|---|---|
| | Filter side | 50.8% |

Bleaching of this material with sodium hydrosulphite bleach (30 lbs/ton) increased the brightness to 56.4%.

One suitable adaptation of the process is detailed in FIG. 1. De-fibred inked newsprint is fed through line 1 into a high-speed pulper 2 fitted with stirrer 3. Water is introduced through line 4 and de-inking chemicals through line 5. The pulp consistency may suitably be about 3% at a temperature of 60°– 80° C. After pulping and ink-release, the pulp-ink mixture is fed through line 6 into mixing vessel 7. Water (and precipitant for soap) is introduced suitably through line 8. Collecting agent (oil) is recycled in line 9 and may be introduced combined with the water and precipitant. The pulp consistency is adjusted to about 1% in vessel 7 for the collection stage. The collecting solids are recycled and introduced into vessel 7 via line 10. The collection stage is desirably carried out at about 40°– 45° C and additional mixing vessels 11 and 12 are shown connected in series to give an adequate holding capacity for a collection time of 10 – 15 min. These mixing vessels 7, 11 and 12 are shown with stirrers 3, and connecting lines 13 and 14. After collection of the ink on the solids, the mixture is carried to a solids separation stage 15. The de-inked pulp is then subjected to pH adjustment at 16 and the cleaned pulp moved to use or storage via 17. The coated solids are separated and moved to a wash (solvent) stage 18 and the solids recycled through line 10 to mixing vessel 7. The solids may be optionally resurfaced or thermally reformed at 19. The loaded solvent is passed to a settling, filtration or centrifuge stage 20 to remove ink solids. The solvent-plus-oil is then passed to an oil-removal stage 21 (distillation), the oil collecting agent recycled via 9, and the solvent recycled via 22 to the wash stage 18.

Further Examples with suitable replacements for the sodium peroxide and pure soaps used in the earlier work were carried out. Materials investigated in these Examples included sodium hydroxide, sodium silicate ('N' grade, National Silicates Ltd.) and tall oil soap skimmings (Kimberly-Clark), with sulphur solids as collector.

De-inking was carried out in essentially the same manner as described previously except the following conditions were changed: (1) the temperature in the de-inking step was usually limited to 80° C, (2) consistency was maintained at about 2.5% throughout the operation, including the fifteen minute collection time, and (3) sulphur powder (Anachemia precipitated sulphur, 1:1 ratio with paper) was used as the collector. Sulphur was removed from the system by means of a hydrocyclone operating at about 0.25% consistency. Ink removal with sodium hydroxide as the principal de-inking agent was not always satisfactory. Consequently most of the Examples concentrate on the use of sodium silicate, although combinations of sodium silicate and sodium hydroxide did show promise. In conjunction with fatty acid soap from tall oil sodium silicate gave good cleaning in the concentration range about 1 – 3%. Higher concentrations tended to be less effective because of ink dispersion. An important factor in favour of sodium silicate is that it can be removed from the system when required (i.e. inactivated during the collection step) by precipitation with e.g. calcium salts, as in the precipitation of fatty acid soaps discussed earlier. Utilizing sodium silicate the addition of suitable amounts of calcium chloride, at the right time, assumes even greater importance than before. Increasing calcium chloride concentration gave increased brightness and even at the 2% level brightness did not appear to hve peaked (the 2% calcium chloride was probably not sufficient to precipitate all the sodium silicate (and soap) present). Soap skimmings behaved as expected by initially giving improved brightness with increasing concentration. Experiments have been carried out with sodium silicate at temperatures up to 92° C with no detrimental effect on brightness. However, a beneficial effect was noted in that the separation of the sulphur, by means of a hydrocyclone, could be achieved much more readily if the temperature was kept at a higher level during the collection state (>70° C). Higher temperatures appeared to encourage agglomeration of the sulphur powder making it more amenable to the separation.

Batches of pulp were de-inked using appropriate quantities of reagents, as determined from accumulated data.

EXAMPLE 6

| 21. | water (80° C) |
|---|---|
| 1.1 ml | 'N' grade sodium silicate soln. (3%) |
| 50 g | inked newspaper |

This mixture was pulped at high speed for 2 minutes, after which 1.6 g — soap skimmings (64% solids). (3.2%) was added. After pulping at high speed for 1 further minute, 1 g. — calcium chloride (2.0%) was added, and the temperature adjusted to 40° C.

Then 50 g — sulphur powder (~325 mesh or 0.03 – 0.05 mm. diameter) was added and the system agitated for 15 minutes. After dilution with 14 l. of water, the coated sulphur was removed by a hydrocyclone. The resulting pulp was thickened and the pH adjusted to 8.5. This pulp was tested for brightness using an Elrepho reflectometer at a wavelength of 570 m$\mu$ and a Hunter reflectometer. The brightness results are:

| | Elrepho reflectometer | Hunter reflectometer (green filter) |
|---|---|---|
| Margins from waste newspaper | 60.2% | 58.1% |
| De-inked newspaper (unbleached) | 60.5% | 54.5% |

Experiments have been made with a variety of commonly occuring contaminants.

EXAMPLE 7

Coloured Comics

| | |
|---|---|
| 200 mls. | water 95° C |
| 0.11 mls. | 'N' grade sodium silicate |
| 5 g | comics paper |

This mixture was pulped at high speed for 2 minutes, then 0.1 ml. of refined tall oil added, and pulped at high speed for a further 2 minutes. Addition of 0.1 g — calcium chloride and 5 g — sulphur (~325 mesh) was made and the system agitated at slower speed for 15 minutes (final temperature 65° C). Dilution with 2 l. of water was made and loaded sulphur removed via a hydrocyclone. The pulp was filtered before testing. Hunter reflectometer brightness (green filter).

| | |
|---|---|
| Margins | 58.7% |
| Original | 31.1% |
| De-inked | 51.3% |

NOTE: Water-soluble or -dispersible dyes were not collected on the sulphur.

EXAMPLE 8

Magazines

Waste magazines were pulped, the ink collected, and the loaded solids removed as in Example 7. The pulp was filtered and tested as before.
Hunter reflectometer brightness (green filter).

| | |
|---|---|
| Margins | 68.6% |
| Original | 56.3% |
| De-inked | 61.3% |

This de-inking of magazines was not as effective as for newspapers, probably because of interference by the coatings used on magazine paper. However, as the de-inked pulp from the magazines has a higher brightness than regular newsprint, this lower single stage efficiency is relatively unimportant.

EXAMPLE 9

Mixture Containing Contaminants ("Contraries")

A mixture of

| | |
|---|---|
| 400 mls. | water (95° C) |
| 0.1 g | paster glue |
| 0.1 g | wax crayon |
| 0.1 g | sealing wax |
| 0.1 g | pitch, | was agitated at high speed to disperse "contraries" in water. After addition of 0.22 mls. — 'N' grade sodium silicate and 10 g — clean margins the system was pulped until fibers were well separated.

A sample (200 mls.) of the contaminated suspension was removed and filtered to give a blank sample, and the remaining material treated with 0.05 g calcium chloride. The temperature was adjusted to 40° C and 5 g of sulphur (~325 mesh) added, then the system agitated for 15 minutes. The pulp was diluted with 2 l. of water and the loaded sulphur separated with a hydrocyclone. The pulp pH was adjusted to 8.7 with alum solution. Hunter reflectometer brightness (green filter):

| | |
|---|---|
| Margins | 59.4% |
| Original | 48.8% |
| De-inked | 54.0% |

A substantial collection of the contaminants was achieved, as reflected in the brightness readings. (4% of "contraries" based on weight of fibers is probably much higher than would be encountered in practice).

EXAMPLE 10

| | |
|---|---|
| 200 ml. | water (80° C) |
| 0.05 g | NaOH (1%) |
| 0.11 ml | 'N' grade sodium silicate (3%) |
| 5 g | shredded inked paper |

This mixture was pulped at high speed for 2 minutes, 0.1 ml. — refined tall oil added, and again pulped at high speed for 2 minutes. After adding 0.05 g — calcium chloride (1%), the temperature was adjusted to 40° C and 5 g — sulphur powder (~325 mesh) blended in.

The ink collection, solids removal and pulp treatment were as in Example 9.
Hunter reflectometer brightness (green filter) — 52.3% (mean of top and bottom).

EXAMPLE 11

| | |
|---|---|
| 200 mls. | water (80° C) |
| 0.11 mls | 'N' grade sodium silicate solution (3%) |
| and 5 g | inked paper | were pulped at high speed for 2 minutes.

After adding 0.16 g — tall oil soap skimmings, 64% solids (3.2%), the mixture was again pulped at high speed for 2 minutes. The addition of 0.1 g — calcium chloride (2%) was made, the temperature adjusted to 40° C, and 5 g — sulphur (~325 mesh) incorporated.

The ink collection, solids removal and pulp treatment were carried out as in Example 9.
Hunter reflectometer brightness (green filter) — 56.4%.

EXAMPLE 12

Since sulphur solids are one preferred type of added collecting solids, microscopic studies were conducted on the ink/soap/sulphur system. Initial tests showed that ink released from waste paper behaved in the same manner and had a similar particle or agglomerate size to fresh ink dispersed in the same system. Therefore, the micrographs could be simplified by using fresh ink in the de-inking medium which eliminated the paper fibers.

A sodium oleate (0.025%) and sodium silicate ('N' grade 0.075%) typical de-inking medium was made up and fresh ink added and dispersed in an amount normally encountered on de-inking. The soap was then precipitated with calcium chloride under agitation. Loose flocs of soap and ink formed with the soap tending to surround and entrain the ink. The flocs ranged up to 1 mm. or more in size. The same procedure was repeated except sulphur powder of about 10–20 micrometers in diameter was added after precipitating the soap. After agitation, a cyclone separation was carried out and the sulphur solids recovered. On microscope examination, these sulphur solids were found to be in the form of small agglomerates of the sulphur powder with ink solids included in many of the agglomerates. The soap had remained behind in suspension with a minor amount of the ink entrained therewith. Because the agglomerates of ink and sulphur were rather weak, they were readily broken under continued agitation conditions thus releasing the co-agglomerated ink for redispersion. (Continued agitation would not lead to increased ink sseparation, but an equilibrium condition was reached).

Larger size sulphur of diameter greater than about 100 micrometers (most were from 100 to 300) was added to the same Na oleate-Na silicate-ink system and the soap precipitated as before. After agitation, cyclone separation, and recovery of the sulphur phase, the individual sulphur particles were observed microscopically to have become with ink, the coating having a continuous smeared appearance with some dark spots of heavier ink concentration. Fresh sulphur solids were mixed with the recovered ink-coated solids and the mixture observed under the microscope. The visual contrast between the coated and uncoated solids was very great.

In a further test still larger sulphur solids of diameters within about 300–800 micrometers were inserted for ink collection. With a less severe agitation being used than for the previous test, on cyclone separation and recovery, the sulphur solids were observed to have more definite dark areas of ink concentration and less of a smeared coating appearance. It was obvious that the ink was being firmly held by the sulphur surfaces.

Results have shown that the relatively large size collecting solids can effectively pick up and retain the much smaller ink particles or agglomerates on the collecting surfaces. Soap solids were observed to function in an entirely opposite manner, i.e. the soap would surround and entrap the ink solids within large soap flocs. Thus, soap solids are not operative as collecting solids which become surface coated according to the present invention. The soap phase is very difficult to handle and process.

According to a preferred embodiment, the method comprises:

a. forming an aqueous pulp of said paper and releasing the ink from the paper fibers to form fine dispersed ink solids in the pulp,
b. agitating the resulting pulp mixture in the presence of relatively extensive sulphur collecting surfaces until said sulphur surfaces pick up and retain a multiplicity of ink particles or agglomerates thereof side-by-side on the sulphur surfaces,
c. separating the ink-coated sulphur surfaces from the pulp by a mechanical separation without froth flotation, and
d. recovering the cleaned paper stock.

We claim:

1. A method of treating waste inked paper to collect and remove ink particules therefrom comprising:
    a. forming an aqueous pulp of said paper in the presence of soluble ink dispersing agent, said agent being at least one of a soap and sodium silicate, thereby releasing the ink particles adhering to the paper fibers and dispersing the ink solids in the pulp,
    b. inactivating the ink dispersing agent present by precipitation with added insolubilizing cation, agitating the resulting aqueous mixture containing ink solids and paper fibers in the presence of inserted selected non-soap collecting solids and collecting ink solids on the surface of the collection solids, said collecting solids having hydrophobic surfaces with strong affinity for said ink solids, the collecting solids being dispersed directly in the aqueous pulp the collecting solids being at least about 0.04 mm. in diameter and large enough that many ink particles or agglomerates thereof adhere side-by-side on the collecting surface, the mixture being brought into intimate contact with the hydrophobic collecting surfaces,
    c. separating the ink-coated collecting solids in easily handled solid form from the paper fibers by a mechanical separation without froth flotation, and
    d. recovering relatively clean paper stock.

2. The method of claim 1 wherein ink is removed from the ink-coated collecting solids in a separate step and the collecting solids recycled to the process.

3. The method of claim 1 wherein other organic contaminants are present, and these contaminants are collected and removed in the same manner as the ink.

4. The method of claim 1 wherein said paper is waste newsprint.

5. The method of claim 1 wherein the collecting solids are selected from sulphur, polyolefins and other vinyl polymers. wax solids, solid petroleum materials, rubber, and rubber waste solids.

6. The method of claim 1 wherein the collecting solids average diameter is at least about 100 micrometers.

7. The method of claim 1 wherein the collecting solids are in the form of prills of average diameter at least about 200 micrometers.

8. The method of claim 1 wherein the collecting solids comprise sulphur prills of average diameter from about 100 to about 800 micrometers.

9. The method of claim 1 wherein solids of average diameter within about 0.2 to 1 mm. are used as collecting solids.

10. The method of claim 1 wherein the collecting solids are susceptible to magnetic attraction and the ink-coated collecting solids are separated magnetically from the paper fibers.

11. The method of claim 1 wherein a collecting agent is present only on the surface of the collecting solids to provide enhanced affinity for, and retention of, the ink solids.

12. The method of claim 1 wherein calcium ions are used to precipitate the soap or silicate.

13. The method of claim 1 wherein a composite dispersant is added in step (a), comprising sodium silicate and a soap, the dispersant being precipitated with calcium ions for step (b).

14. The method of claim 1 wherein waste newsprint is pulped and ink released therefrom utilizing added oleate or linoleate soap, with a pH of about 10–11.

15. The method of claim 1 wherein the ink-coated collecting solids are separated from the paper fibers by centrifugal means.

16. The method of claim 15 wherein the ink-coated solids are separated by hydrocyclone means.

17. The method of claim 1 wherein the weight ratio of collecting solids to paper fiber is up to 5:1.

18. The method of claim 1 wherein the ink collection on the collecting solids is carried out in two or more stages.

19. The method of claim 1 wherein the pH after removal of the ink-coated solids, is adjusted to about 8 to 9.

20. The method of claim 1 wherein the waste paper is pulped to a consistency of up to about 7%, for the ink-release stage, the consistency being within about 0.5 to 5% for the ink-collection stage, and the consistency being not more than about 2% for the ink-coated solids removal stage.

21. The method of claim 1 wherein the temperature of the pulp is selected to optimize ink collection on the solids, and separation of the ink-coated solids from the pulp, said temperature being about 70° to 92° C with sulphur solids, and about 30° to 50° C with the other collecting solids.

22. A method of treating waste inked paper to collect and remove ink therefrom, comprising:

a. forming an aqueous pulp of said paper and releasing the ink from the paper fibers to form fine dispersed ink solids in the pulp,
b. providing that no active ink dispersant is present and agitating the resulting pulp mixture in the presence of inserted sulphur solids having a diameter of at last about 10 micrometers until said sulphur solids pick up and retain a multiplicity of ink particles or agglomerates thereof side-by-side on the surfaces of the sulphur solids.
c. separating the ink-coated sulphur solids from the pulp by a mechanical separation without froth flotation, and
d. recovering the cleaned paper stock.

* * * * *